Figure 1:
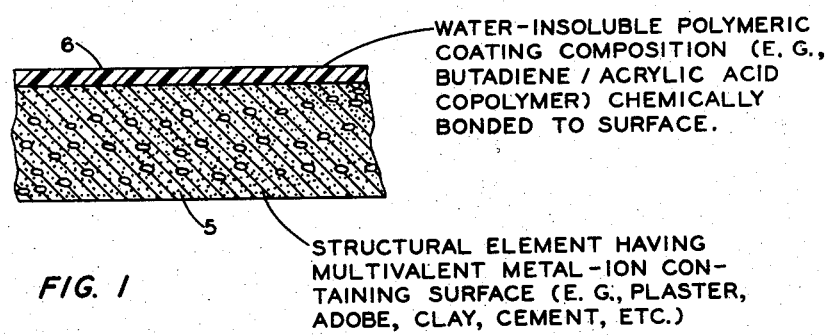

July 14, 1959  C. A. URANECK ET AL  2,894,857
PROCESS OF APPLYING RESINOUS WATERPROOF COATING
TO MULTIVALENT METAL ION-CONTAINING
SURFACES AND RESULTANT ARTICLE
Filed Feb. 5, 1954

INVENTORS
CARL URANECK
R. J. SONNENFELD
BY
*Hudson & Young*
ATTORNEYS

United States Patent Office 2,894,857
Patented July 14, 1959

2,894,857

PROCESS OF APPLYING RESINOUS WATERPROOF COATING TO MULTIVALENT METAL ION-CONTAINING SURFACES AND RESULTANT ARTICLE

Carl A. Uraneck, Phillips, Tex., and Richard J. Sonnenfeld, Norman, Okla., assignors to Phillips Petroleum Company, a corporation of Delaware Application February 5, 1954, Serial No. 408,584

35 Claims. (Cl. 117—118)

This invention relates to paint formulations in which acidic polymers are applied per se or in the form of their water-soluble salts to multivalent metal ion-containing surfaces. The invention further relates to waterproof coatings for multivalent metal salt-containing surfaces such as plaster, plaster of Paris, clay, cement, stucco, and the like.

The polymeric materials having a multiplicity of acid groups which are applicable in this invention are prepared by copolymerization of an acidic monomer containing at least one acid group per molecule with one or more materials copolymerizable therewith, at least one of which is a conjugated diene. In accordance with one embodiment of this invention, these polymeric materials are converted to water-soluble salts by treatment with a base such as an alkali metal hydroxide or carbonate, ammonium hydroxide, or a water-soluble amine. In another embodiment of the invention, these coating compositions are applied in the form of the acidic polymer. In either embodiment, the polymer may be applied as the prime coat prior to the application of other coating materials or, by incorporation therein of suitable pigments, can be used also as the main coat. When these polymeric materials are employed as surface coatings for any materials containing multivalent metals in a form in which they can react, a reaction occurs and a water-insoluble layer or coating is formed. For example, these coating compositions may be applied to multivalent metal salt-containing surfaces such as plaster, brick, plaster of Paris, stucco, cement, etc., resulting in the formation of insoluble salts of the multivalent metals with the polymeric materials. Polymeric materials of the type described will react with such multivalent metal ions as those of barium, calcium, magnesium, mercury, copper, iron, lead, nickel, cobalt, aluminum, and the like, to form water-insoluble salts.

An object of the invention is to provide a process for forming a waterproof coating on a multivalent metal ion- or metal salt-containing surface. Another object is to provide a process of forming a waterproof coating on a multivalent metal ion- or metal salt-containing surface by applying to said surface a polymer prepared by reacting an acidic monomer with one or more compounds copolymerizable therewith, at least one of which is a conjugated diene. A further object involves applying said polymer in either acidic form or in partially or wholly neutralized form to said surface, the resulting reaction between the surface and the polymer forming a water-insoluble coating. An additional object is the addition of a polymeric coating to plaster of Paris, plaster, adobe, clay walls, cement surfaces, bricks, etc., the resulting reaction forming a water-insoluble coating on said surfaces. An added object entails the formation of a water-insoluble paint on said surfaces by the inclusion of suitable pigments in said polymer.

Figure 2:
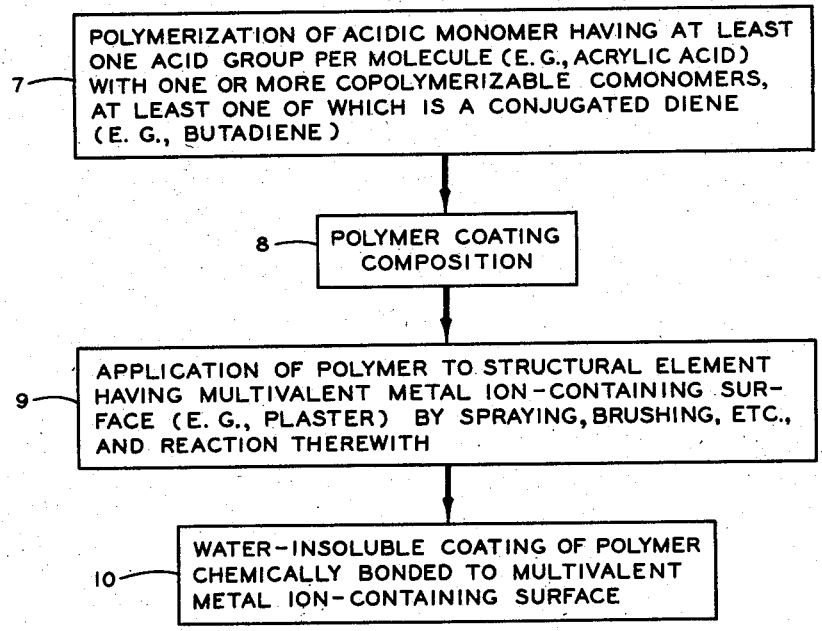

In the drawing, Figure 1 is a diagrammatic cross-sectional view of a structural element having a surface thereof coated with the novel polymeric coating composition of this invention, and Figure 2 is a flow diagram illustrating the process of applying or coating the surface of said structural element with said polymeric coating composition in accordance with this invention.

Acidic monomers or monomers which contain at least one acid group per molecule which are applicable include acrylic acid, alpha and beta chloroacrylic acid, and various alpha and beta alkyl-substituted derivatives in which the alkyl group contains from one to eight carbon atoms such as methacrylic acid, crotonic acid, alpha and beta ethyl-, propyl-, butyl-, amyl-, hexyl-, heptyl-, and octyl-acrylic acids, phenylacrylic acids, i.e., atropic and cinnamic acids, and vinylacrylic acids. Unsaturated dicarboxylic acids such as fumaric, maleic, itaconic, teraconic, and citraconic acids are also applicable, along with derivatives thereof such as monoesters from methyl to octyl, alkyl derivatives, i.e., alkyl groups from methyl to octyl attached to the central carbon atoms, and halogen-substituted derivatives such as chloromaleic acids. Of the acidic monomers which are applicable, acrylic, methacrylic, and chloroacrylic acids are preferred. The acidic monomer may also contain sulfonic, phosphonic, acid sulfate, or acid phosphate groups as well as carboxy groups.

Materials which are copolymerized with the acidic monomers are conjugated dienes which preferably contain from 4–6, inclusive, carbon atoms per molecule, but those which contain more carbon atoms per molecule, e.g., eight, can also be used. These compounds include 1,3-butadiene, chloroprene, isoprene, piperylene, methylpentadiene, 2,3-dimethyl-1,3-butadiene, and others. Furthermore, various alkoxy, such as methoxy and ethoxy, and cyano derivatives of these conjugated dienes can also be employed. A single conjugated diene can be polymerized with an acidic monomer or conjugated dienes can be used in admixture with each other or with other polymerizable compounds in addition to the acidic monomers, i.e., terpolymers are applicable in this invention as well as copolymers. In the case of copolymers, the use of monoolefins with an acid alone is not contemplated since, under some conditions, only a 1–1 addition product is formed, not a high molecular weight polymer.

As the third component in the case of terpolymers, any unsaturated compound which contains a terminal $CH_2=C<$ group can be used. Among the compounds which are applicable are styrene, alpha-methylstyrene, various halogen-, alkyl-, and alkoxy-substituted styrenes, acrylonitrile, methacrylonitrile, methyl acrylate, ethyl acrylate, propyl acrylates, butyl acrylates, and the corresponding methacrylates, methyl vinyl ether, methyl isopropenyl ketone, vinyl chloride, vinylidene chloride, vinyl acetate, methyl vinyl ketone, etc. Any of these compounds could, of course, be individually copolymerized with the acidic monomer to form copolymers. Many other compounds are applicable, but it is necessary that only those compounds be used which do not react with the acid groups of the acidic monomers.

The polymers can be prepared by any method known to the art, such as mass or emulsion polymerization. When they are prepared by emulsion polymerization, acid-side recipes are used and the pH of the aqueous phase is generally below 4.

While direct polymerization methods as discussed above are generally preferred, it is to be understood that any method can be employed for the preparation of copolymers containing a multiplicity of acid groups. For example, they can be prepared by indirect methods, i.e., by treatment of a polymer under suitable conditions to convert any groups present to acidic groups or to introduce acidic groups into the polymer. Such methods include hydrolysis of copolymers containing a multiplicity of —CN groups, graft-type polymerization wherein a carboxy-containing monomer is polymerized in the presence of an unsaturated polyelectrolyte, or any other method which will yield the desired polymer.

The carboxy-containing monomer is employed in an amount in the range between 1 and 75 parts by weight, preferably between 10 and 50 parts by weight, per 100 parts total polymeric material.

When preparing the acidic polymers by the copolymerization of an acidic monomer with a copolymerizable material, as hereinbefore described, the acidic monomer is generally employed in an amount in the range between 1 and 75 parts by weight per 100 parts of total monomeric material. The remaining monomeric material is a conjugated diene, a mixture of conjugated dienes, or a mixture of a conjugated diene with another polymerizable compound. It is usually preferred that at least one part by weight, and generally 5 or more parts by weight of conjugated diene per 100 parts total monomer be employed.

If the polymer is to be used in water solution it must be of such nature that it can be converted to a water-soluble salt by treatment with a base. In this case the ratio of acid monomer to other monomer is adjusted in such a way that the resulting polymer can be converted to a water-soluble salt.

When a water solution of the paint is desired, the polymer can be converted to a water-soluble salt by treatment with a base. Bases which are employed to convert the acidic polymers to water-soluble salts are generally added in the form of an aqueous solution to the dry polymer or to a latex. Inorganic bases include alkali metal hydroxides and carbonates, such as lithium, sodium, and potassium hydroxides and carbonates, ammonium hydroxide, etc. Any alkali metal or ammonium hydroxide can be used, but of the alkali metal hydroxides, those of sodium and potassium are most frequently preferred. Of the amines which are employed, those which are readily volatile, i.e., those which have boiling points below 80° C., are most frequently preferred. Compounds of this type include methylamine, ethylamine, dimethylamine, trimethylamine, diethylamine, methylethylamine, methylpropylamine, n - propylamine, isopropylamine, n-butylamine, sec-butylamine, tert-butylamine, and the like. Higher boiling amines include mono-, di-, and tri-ethanolamines. The bases cannot only be used in the form of their aqueous solution but also the higher boiling ones can be milled into the solid polymer and the mixture contacted with water to effect solubilization.

The base can be added either to a latex or to the solid polymer. When it is added to a latex, any amount of base up to that which will effect complete neutralization of the acid groups in the polymer can be used. When the starting material is a solid polymer, sufficient base must be added to effect solution. The amount of base will depend upon the ratio of acidic monomer to other monomer, but will usually be an amount which will effect at least 50 percent neutralization of the acid groups in the polymer. In any event, the amount of base will preferably not be more than is required for complete neutralization of the acid groups.

The concentration of the polymer in the coating compositions, i.e., in the solutions or dispersions prepared for application to multivalent metal-containing surfaces, can vary from 1 to 60 percent by weight but is preferably in the range between 2 and 30 percent by weight. A composition must be of such consistency that it can be applied by brushing, spraying, or any other means. The coating compositions can be applied in the form of aqueous solutions of alkali metal, ammonium, or amine salts, in the form of latices, or as solutions in organic solvents. When fairly high polymer concentrations are desired, it is convenient to use the polymer in latex form since latices can be prepared which have relatively low viscosity but high polymer concentration. Solutions of polymers become increasingly viscous with an increase in polymer concentration. When lower polymer concentrations are desired, any of the methods of preparation of the compositions can be used, i.e., the polymer can be used in the form of a latex, a solution in an organic solvent, or a solution in a basic material, as hereinbefore described.

Other ingredients can be added if desired, such as antiskinning agents and emulsifying or dispersing agents. The emulsifying or dispersing agents aid in forming stable dispersions of the pigments in the polymer solution. However, while these additional surface-active materials are sometimes employed, they are usually not considered essential since the polymer solutions themselves are emulsifying agents. In addition, plasticizers, antioxidants, vulcanizing agents, drying catalysts, cross-linking agents, miscible resins, antifoam agents, and germicides can also be included. A variety of pigments may be dispersed in the polymer, the only limitation being that they must not react with the polymer to an extent that would prevent subsequent reaction between the polymer and the surface to which it is applied. Preferably, the pigment is inert with respect to the polymer.

Referring to the drawing, Figure 1 shows a structural element 5, such as plaster, adobe, clay, cement, etc., having a surface thereof coated with the water-insoluble polymeric coating composition 6 chemically bonded thereto. This coating is obtained as illustrated in the flow diagram of Figure 2, the coating composition having been prepared by polymerization (step 7) of an acidic monomer with one or more copolymerizable comonomers, at least one of which is a conjugated diene. The coating composition 8 is applied (step 9) to the structual element having a multivalent metal ion-containing surface by spraying, brushing, etc., the coating composition reacting with said surface to form a water insoluble coating 10.

The versatility of the paint formulations of this invention is perhaps their most important and promising characteristic. Thus, while they may be applied by spraying, brushing, or any other suitable means to old or cured surfaces, the striking fact is that they can be applied with equal effectiveness to freshly prepared, moist surfaces. This eliminates the necessity for extended curing periods prior to the coating operation. This can be of value in several ways. For example, the coating applied to the wet surface may not only serve as the final coat, but also as a primer for the application of a top coat. For example, the polymeric compositions of this invention can be applied to a damp plaster surface and covered in a few hours with an oleoresinous paint top coat. The top coat can be not only oleoresinous, but also enamel, varnish, lacquer, or any other containing organic solvents. This time-saving factor can be of considerable importance in painting plastered interiors since, at present, painters must wait for plaster to dry, and in some cases to age, before certain types of paint can be applied. This waiting time can be eliminated by applying the paint formulations of this invention directly to the wet plaster. This invention has practical application in the coating of surfaces other than plaster, e.g., fresh cement can be coated with one of the polymeric compositions of this invention as protection against damage or destruction by rain.

While water base paints can also be used as topcoats over the polymeric undercoatings of this invention, less advantage is realized here, since such paints could normally be applied directly to damp surfaces anyhow, unlike oil base paints which are incompatible with damp surfaces.

Where the polymeric coating is to function as a subcoat for an alkali-sensitive top coat, the polymer should be applied in the original acidic form rather than in the form of the water-soluble salt. The acidic form will neutralize any alkaline compounds in the surface being painted, leaving none to react with the top coat. A different result follows when the coating is applied in the form of a water-soluble polymeric salt. If, e.g., an alkali metal salt of the polymer is used, alkali metal hydroxides will be released to the surface of the film, these being formed by hydrolysis of the alkali metal ions liberated from the polymer when it reacts with the wall. The presence of this alkaline material in the surface of the film will, of course, adversely affect a subsequently-applied alkali-sensitive top coat. This is brought out further in Example I below.

Example I illustrates how the polymeric composition, both in carboxylic and alkaline salt form, is prepared and is painted upon a multivalent metal salt-containing surface, a plaster, resulting in a water-insoluble reaction product.

*Example I*

1,3-butadiene was copolymerized with acrylic acid in an aqueous emulsion system at 41° F. in accordance with the following recipe:

| | Parts by weight |
|---|---|
| Butadiene | 50.0 |
| Acrylic acid | 50.0 |
| Benzene | 75.0 |
| Water | 315.0 |
| Duponol ME [1] | 8.0 |
| Tert-dodecyl mercaptan | 1.0 |
| Tert-butylisopropylbenzene hydroperoxide | 0.229 |
| KCl | 0.1 |
| $FeSO_4 \cdot 7H_2O$ | 0.278 |
| $K_4P_2O_7$ | 0.330 |

[1] Sodium lauryl sulfate.

A conversion of approximately 80 percent was reached in 5 hours. The latex was coagulated by the brine-alcohol method.

Another run was made for the production of a butadiene/acrylic acid copolymer latex using the same recipe as that given above except that 150 parts benzene was used instead of 75 parts. The 5-hour conversion in this instance was also 80 percent.

The polymers contained up to 42 percent by weight of combined acrylic acid.

Plaster samples were prepared by mixing together slaked lime, sand, asbestos, and water. After this mixture had hardened, a thin layer of a slaked lime-water mixture was smoothed onto the surface. The moist plaster was then painted with different samples of a 50/50 butadiene/acrylic acid copolymer. Four of the samples were prepared by treating different portions of the copolymer with a 1 N aqueous solution of potassium hydroxide to effect different amounts of neutralization. The concentration was adjusted to give solutions containing 6 percent polymer by weight. A description of each sample follows:

(1) A 50/50 butadiene/acrylic acid copolymer 50% neutralized with potassium hydroxide.
(2) A 50/50 butadiene/acrylic acid copolymer 75% neutralized with potassium hydroxide.
(3) A 50/50 butadiene/acrylic acid copolymer 87.5% neutralized with potassium hydroxide.
(4) A 50/50 butadiene/acrylic acid copolymer 100% neutralized with potassium hydroxide.
(5) A 50/50 butadiene/acrylic acid copolymer dissolved in absolute ethyl alcohol to give a 4 weight percent solution.
(6) A 50/50 butadiene/acrylic acid copolymer latex.

Strips of plaster were coated with each of the samples described above and the treated sections were tested in two ways. In the first test, drops of water were applied to the painted strips. The water remained on the film until it evaporated, no absorption being observed during this period. This was evidence that the coatings were waterproof.

A second test was made to detect the presence of alkali in the surface of the coating, based on the principle that the less the alkali, the better the coating will function as a subcoat for alkali-sensitive top coats. In this test drops of phenalphthalein were put on each strip to determine the presence of alkali thereon. It was found that the acidic forms of the polymer, samples 5 and 6 (the alcohol solution and the latex sample), were the most effective in suppressing the presence of alkali on the surface of the film. This indicates that if the acidic form of the polymer is used there will be no release of alkaline compounds to the surface of the film.

*Example II*

A 10 percent solution of potassium butadiene-acrylate (prepared by neutralizing a 70/30 butadiene/acrylic acid copolymer with KOH) was painted on the surface of plaster of Paris. The layer formed on the plaster was completely water-insoluble, whereas a layer formed on a glass surface was completely water-soluble. (While glass contains combined alkali and alkali earth elements in combined form, these compounds are too inert to react with the paint layer.)

*Example III*

Three lime-stucco slabs, hereafter referred to as A, B, C, were cast, using two parts lime, one part cement, and six parts of sand, all parts by volume. After these samples had set for about hour, the left half of slab A was painted with a 70/30 butadiene/acrylic acid latex. The left half of slab B was painted with a $NH_4OH$-neutralized 70/30 butadiene/acrylic acid copolymer solution. The left half of slab C was painted with an equimolar mixture of 70/30 butadiene/acrylic acid latex and 70/30 butadiene/methylvinyl-pyridine latex. When the painted strips were dry (10 minutes) three horizontal stripes were painted across each sample, the left half of each stripe being applied, of course, to the polymeric undercoating, while the right half was applied directly to the stucco surface. One each slab the top stripe was a quick-drying Industrex enamel; this, broadly, is a high polymeric resin in an organic solvent containing a pigment. The center strip was Glidden Spred Satin paint, basically a high polymer latex containing a pigment. The bottom stripe was Glidden Spred Satin paint mixed with an $NH_4OH$-neutralized 70/30 butadiene/acrylic acid copolymer.

The painted samples were placed in a humidor for 6½ days, then removed and allowed to air-dry. The samples were then compared. The left-hand or undercoated half of the several stripes was smooth and even; the unprimed or right-hand half was irregular and spotty. Since, however, it might have been expected that the quality of the primed topcoat would be superior to that of the nonprimed coat, a further test was made to determine whether the superiority was not also due in part to the type of undercoat used.

In this test a stucco sample was cast using three parts hydrated lime, one part cement, and nine parts sand, all parts by volume. When the slab was 24 hours old the left half of one side was painted with a 70/30 butadiene/ acrylic acid latex. Both halves were then painted with a coat of Industrex quick-drying enamel. The left half or undercoated side, when dry, had a smooth, glossy, uniform surface, whereas the right half, with no undercoating, was dull, irregular, and spotty (alternately bright and dull areas). So far, this conforms to the tests described above. A second coat of enamel was then applied to the right half. When dry this coat was still irregular and spotty, in sharp contrast to the left half.

These tests are evidence that (1) the paint formulations of this invention when applied to fresh, uncured, multivalent metal salt-containing surfaces form a good undercoat for conventional oil paint topcoats, and (2) as undercoats they are superior to those resulting from conventional oil base paint undercoats.

From a consideration of the above specification, it will be appreciated that many changes may be made in details therein given without sacrificing any of the advantages thereof or departing from the scope of the invention.

We claim:

1. In a process for forming a waterproof coating on a surface containing multivalent metal ions, the improvement comprising applying to said surface a high molecular weight polymer formed by a process which comprises polymerizing a mixture containing an acidic monomer and a conjugated diene, said applied polymer reacting with said surface to form a water-insoluble polymeric salt.

2. In a process for forming a waterproof coating on a surface comprising a multivalent metal compound the improvement comprising applying to said surface a coating composition containing from 1 to 60 percent by weight of a high molecular weight polymer formed by a process which includes polymerizing a mixture containing an acidic monomer and a conjugated diene, said applied polymer reacting with said surface to form a water-insoluble polymeric salt.

3. The process of claim 2 wherein a pigment substantially inert to the polymer is dispersed in the polymer and the resulting coating is a paint film.

4. The process of claim 2 wherein said surface is plaster.

5. The process of claim 2 wherein said surface is plaster of Paris.

6. The process of claim 2 wherein said surface is brick.

7. The process of claim 2 wherein said surface is clay.

8. The process of claim 2 wherein said surface is stucco.

9. In a process for forming a waterproof coating on a surface comprising a multivalent metal compound, the improvement comprising applying to said surface a coating composition containing from 2 to 30 percent by weight of a high molecular weight polymer prepared by a process which includes polymerizing a mixture containing a carboxy-containing monomer and a conjugated diene, said applied polymer reacting with said surface to form a water-insoluble polymeric salt.

10. The process of claim 9 wherein the polymer is an acrylic acid-1,3-butadiene copolymer.

11. The process of claim 9 wherein the polymer is a methacrylic acid-1,3-butadiene copolymer.

12. The process of claim 9 wherein the polymer is a styrene-acrylic acid-1,3-butadiene terpolymer.

13. The process of claim 9 wherein the polymer is an acrylonitrile-acrylic acid-1,3-butadiene terpolymer.

14. The process of claim 9 wherein the polymer is a maleic acid-1,3-butadiene copolymer.

15. The process of claim 9 wherein a pigment substantially inert to the polymer is dispersed in the polymer and the resulting coating is a paint film.

16. In a process for forming a waterproof coating on a surface comprising a multivalent metal compound, the improvement comprising applying to said surface an aqueous solution containing 2 to 30 percent by weight of a high molecular weight polymer prepared by a process which includes polymerzing a mixture containing a carboxy-containing monomer and a conjugated diene, and converting the resulting polymer to a water-soluble polymeric salt, said salt reacting with said surface to form a water-insoluble polymeric salt.

17. The process of claim 16 wherein a pigment is dispersed in the polymer resulting in the formation of a waterproof paint film.

18. The process of claim 16 wherein the polymer is a water-soluble salt of a maleic acid-1,3-butadiene copolymer.

19. The process of claim 16 wherein the polymer is a water-soluble salt of an acrylonitrile-acrylic acid-1,3-butadiene terpolymer.

20. The process of claim 16 wherein the polymer is a water-soluble salt of a styrene-acrylic acid-1,3-butadiene terpolymer.

21. The process of claim 16 wherein the polymer is a water-soluble salt of an acrylic acid-1,3-butadiene copolymer.

22. The process of claim 16 wherein the polymer is a water-soluble salt of a methacrylic acid-1,3-butadiene copolymer.

23. A structural element having multivalent metal ions in the surface thereof chemically bonded to a polymeric coating composition comprising a polymer of an acidic monomer and a conjugated diene, the resulting bond forming a waterproof coating.

24. A structural element according to claim 23 wherein said polymer is an acrylic acid-1,3-butadiene copolymer.

25. A structural element according to claim 23 wherein said polymer is a methacrylic acid-1,3-butadiene copolymer.

26. A structural element according to claim 23 wherein said polymer is a styrene-acrylic acid-1,3-butadiene terpolymer.

27. A structural element according to claim 23 wherein said polymer is an acrylonitrile-acrylic acid-1,3-butadiene terpolymer.

28. A structural element according to claim 23 wherein said polymer is a maleic acid-1,3-butadiene copolymer.

29. A structural element according to claim 23 wherein said surface is plaster.

30. A structural element according to claim 23 wherein said surface is plaster of Paris.

31. A structural element according to claim 23 wherein said surface is brick.

32. A structural element according to claim 23 wherein said surface is clay.

33. A structural element according to claim 23 wherein said surface is stucco.

34. The article of claim 23 wherein a pigment is incorporated in the composition so as to form a paint.

35. A structural element having a plaster surface chemically bonded to polymeric coating composition comprising a copolymer of acrylic acid and 1,3-butadiene, the resulting bond forming a water-insoluble polymeric salt.

References Cited in the file of this patent

UNITED STATES PATENTS

| | | |
|---|---|---|
| 2,272,057 | Cheetham | Feb. 3, 1942 |
| 2,279,293 | Clifford | Apr. 14, 1942 |
| 2,604,668 | Miller | July 29, 1952 |
| 2,650,173 | Goulding | Aug. 25, 1953 |
| 2,716,619 | Jobbins | Aug. 30, 1955 |
| 2,790,736 | McLaughlin | Apr. 30, 1957 |